(12) United States Patent
Oh et al.

(10) Patent No.: US 9,327,607 B2
(45) Date of Patent: May 3, 2016

(54) AUTOMATED RECHARGING SYSTEM AND METHOD FOR AN ELECTRIC VEHICLE USING RFID TAGS

(71) Applicants: GM GLOBAL TECHNOLOGY OPERATIONS LLC, Detroit, MI (US); Seoul National University R & DB Foundation, Seoul (KR)

(72) Inventors: Hyungan Sean Oh, Seoul (KR); Byungchul An, Seoul (KR); Anthony L. Smith, Troy, MI (US); Chongwoo Park, Seoul (KR)

(73) Assignees: GM Global Technology Operations LLC, Detroit, MI (US); Seoul National University R&DB Foundation, Seoul (KR)

( * ) Notice: Subject to any disclaimer, the term of this patent is extended or adjusted under 35 U.S.C. 154(b) by 329 days.

(21) Appl. No.: 13/891,679

(22) Filed: May 10, 2013

(65) Prior Publication Data
US 2014/0333261 A1 Nov. 13, 2014

(51) Int. Cl.
*H02J 7/00* (2006.01)
*B60L 11/18* (2006.01)

(52) U.S. Cl.
CPC ......... *B60L 11/1827* (2013.01); *B60L 11/1818* (2013.01); *B60L 11/1833* (2013.01); *B60L 11/1846* (2013.01); *B60L 2250/10* (2013.01); *Y02T 10/7005* (2013.01); *Y02T 90/121* (2013.01); *Y02T 90/125* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
CPC ............ B60L 11/1827; B60L 11/1833; Y02T 90/125
USPC ........................................................ 320/109
See application file for complete search history.

(56) References Cited

U.S. PATENT DOCUMENTS

| | | | | |
|---|---|---|---|---|
| 5,654,621 A | * | 8/1997 | Seelig ........................... | 320/108 |
| 5,821,731 A | * | 10/1998 | Kuki ................... | B60L 11/1805 320/108 |
| 6,157,162 A | * | 12/2000 | Hayashi .............. | B60L 11/1818 320/104 |
| 6,194,854 B1 | * | 2/2001 | Uchibori ............. | B60L 11/1816 318/139 |
| 7,999,506 B1 | * | 8/2011 | Hollar ................. | B60L 11/1818 320/104 |
| 8,384,344 B1 | * | 2/2013 | Rogers ...................... | H02J 7/00 180/65.21 |
| 8,917,056 B2 | * | 12/2014 | Jung ........................ | H02J 5/005 180/65.21 |
| 2011/0066515 A1 | * | 3/2011 | Horvath .............. | B60L 11/1818 705/17 |

(Continued)

*Primary Examiner* — Yalkew Fantu
*Assistant Examiner* — Manuel Hernandez
(74) *Attorney, Agent, or Firm* — Quinn Law Group, PLLC

(57) ABSTRACT

An automated recharging system includes an electric vehicle and a charging apparatus. The electric vehicle includes a rechargeable energy storage system (RESS), a charging receptacle, and a first controller configured to monitor the status of the electric vehicle and the charge level of the RESS. The charging apparatus includes a charging plug configured to mate with the charging receptacle to recharge the RESS, and a movement mechanism to substantially align the charging plug with and insert it into the charging receptacle. The charging apparatus also includes a second controller to control the movement mechanism and to communicate with the first controller. The electric vehicle further includes an array of radio-frequency identification (RFID) tags arranged around the charging receptacle, and the charging apparatus further includes a RFID reader configured to read the RFID tags to determine the location of the charging plug in relation to the charging receptacle.

20 Claims, 5 Drawing Sheets

(56) References Cited

U.S. PATENT DOCUMENTS

| | | | |
|---|---|---|---|
| 2013/0033224 A1* | 2/2013 | Raedy | H02J 7/025 320/107 |
| 2013/0076902 A1* | 3/2013 | Gao | B25J 9/042 348/148 |
| 2013/0119926 A1* | 5/2013 | Lin | H02J 7/025 320/108 |
| 2014/0015328 A1* | 1/2014 | Beaver | B60L 11/182 307/104 |
| 2014/0217966 A1* | 8/2014 | Schneider et al. | 320/108 |

* cited by examiner

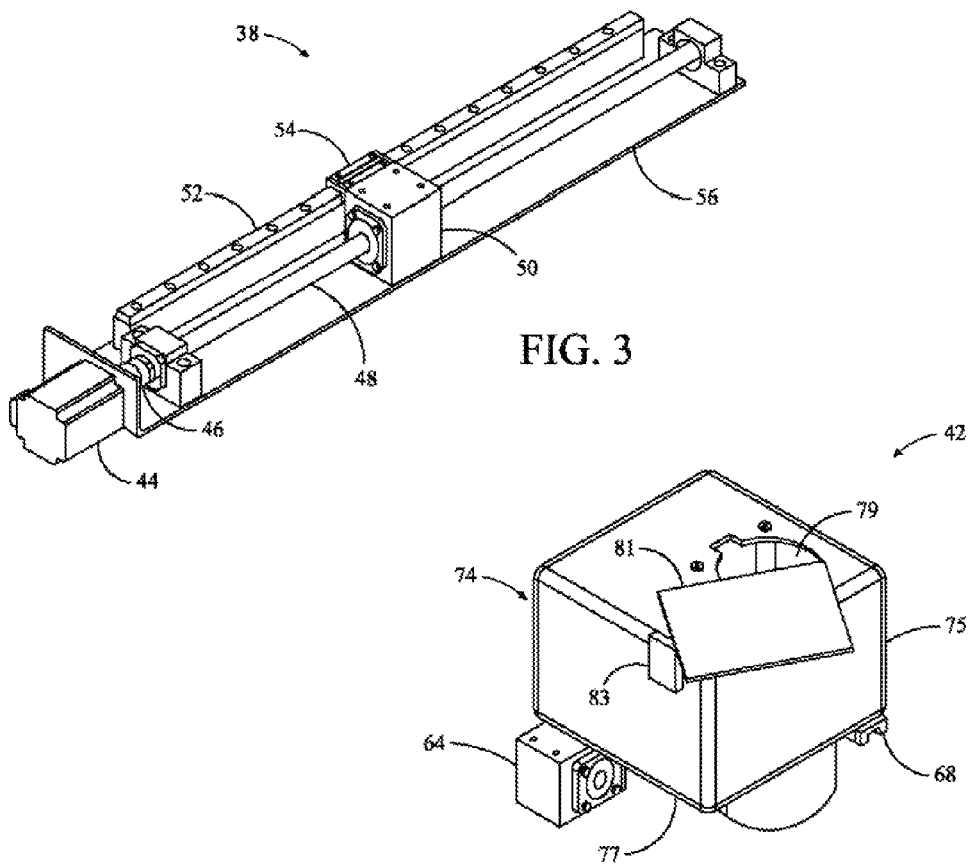
FIG. 3
FIG. 5A
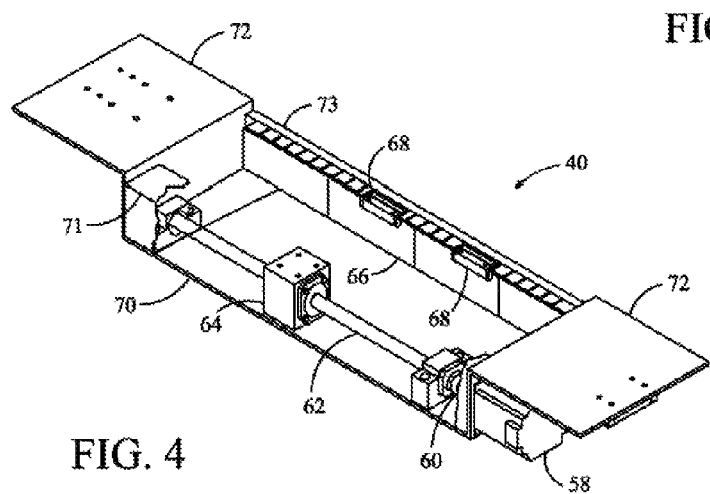
FIG. 4

AUTOMATED RECHARGING SYSTEM AND METHOD FOR AN ELECTRIC VEHICLE USING RFID TAGS

TECHNICAL FIELD

The present invention relates to a system and a method for automatically recharging an electric vehicle.

BACKGROUND

Electric vehicles generally operate on electricity, and as such include an electric motor to propel the vehicle, either solely or in conjunction with an internal combustion engine. The electric motor generally receives electric power from an electric power source, such as an energy storage system (ESS). The ESS may include a battery pack or other rechargeable energy storage means. The battery charge depletes and as such needs to be recharged. Charging stations are utilized to connect the electric vehicle to the power grid to recharge the battery.

SUMMARY

An automated recharging system is provided. The automated recharging system includes an electric vehicle and a charging apparatus. The electric vehicle has a rechargeable energy storage system (RESS), a charging receptacle in electrical communication with the RESS, a plurality of radio-frequency identification (RFID) tags arranged in an array around the charging receptacle, and a first controller configured to monitor the status of the electric vehicle (e.g., if it is parked), a charge level of the RESS, and the charging receptacle.

Each RFID tag has a primary reception zone with an associated tag identification (ID) value. At least two of the primary reception zones may overlap to create at least one secondary reception zone having an associated tag sum value. The tag sum value is equal to the sum of the tag ID values associated with the at least two overlapping primary reception zones. One of the plurality of tag ID values or the at least one tag sum value may be assigned to the location of the charging receptacle.

The charging apparatus has a charging plug configured to mate with the charging receptacle of the electric vehicle to recharge the RESS. The charging apparatus also has a RFID reader configured to read at least one of the plurality of RFID tags.

The charging apparatus further includes a movement mechanism configured to substantially align the charging plug with the charging receptacle, and to insert the charging plug into the charging receptacle. The movement mechanism may include a first movement device, a second movement device, and a third movement device configured to move the charging plug laterally, longitudinally, and vertically, respectively, where the charging plug is connected to the third movement device. The first movement device, the second movement device, and the third movement device may include a first motor, a second motor, and a third motor, respectively, which may be stepper motors. The first movement device and the second movement device further may include a ball screw mechanism to translate motor torque generated by the first motor and the second motor, respectively, into linear movement. The third movement device may include a rack-and-pinion mechanism to similarly translate motor torque generated by the third motor into linear movement in a vertical direction.

The charging apparatus further includes a second controller. The second controller is configured to control the movement mechanism, to initiate and terminate the recharging of the RESS, to communicate with the RFID reader, and to communicate with the first controller. The electric vehicle and the charging apparatus may have a first wireless communication module and a second wireless communication module, respectively, to enable communication between the first controller and the second controller.

A method for automatically recharging a RESS of an electric vehicle is also provided. The method utilizes the automated recharging system described above. The method includes first receiving, by the second controller, a first signal from the first controller indicating that the electric vehicle is parked and ready for recharging.

The method then includes aligning the charging plug with the charging receptacle. This may include receiving, by the RFID reader, a tag ID value from at least one associated RFID tag, and then transmitting the at least one tag ID value to the second controller. The second controller may then calculate and process a tag sum value to determine an initial location of the charging plug in relation to the charging receptacle. The movement mechanism may then move the charging plug such that it is substantially aligned with the charging receptacle.

The method then includes inserting the charging plug into the charging receptacle, and finally charging the RESS of the electric vehicle.

The method may further include receiving, by the second controller, a second signal from the first controller that the RESS is charged to a desired charge level. The method may then include terminating the charging of the RESS, and removing the charging plug from the charging receptacle.

The above features and advantages, and other features and advantages of the present invention are readily apparent from the following detailed description of some of the best modes and other embodiments for carrying out the invention, which is defined solely by the appended claims, when taken in connection with the accompanying drawings.

BRIEF DESCRIPTION OF THE DRAWINGS

FIG. 3 is a schematic, perspective view of a first movement device of the movement mechanism of FIG. 2;

FIG. 4 is a schematic, perspective view of a second movement device of the movement mechanism of FIG. 2;

FIG. 5A is a schematic, perspective view of a third movement device of the movement mechanism of FIG. 2;

DETAILED DESCRIPTION

Figure 1:
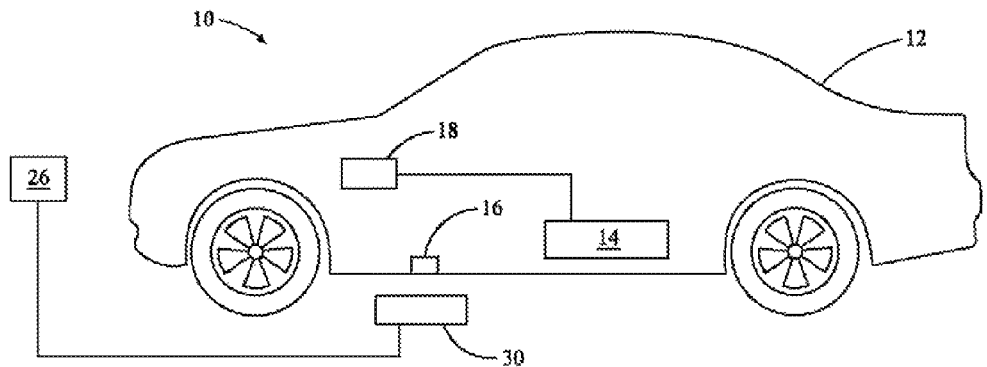
FIG. 1 is a schematic, side view of an automated recharging system having an electric vehicle and a charging apparatus.

Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Referring to the drawings, wherein like reference numbers correspond to like or similar components wherever possible throughout the several figures, an automated recharging system 10 is shown. The automated recharging system 10 includes an electric vehicle 12 and a charging apparatus 30. The electric vehicle 12 generally is any vehicle that may operate on electric power. The charging apparatus 30 is generally positioned underneath the electric vehicle 12, and is connected to a power source 26, which may include, but is not limited to, the electrical power grid.

The electric vehicle 12 has a rechargeable energy storage system (RESS) 14 and a charging receptacle 16 in electrical communication with the RESS 14. The RESS 14 is generally any device capable of storing energy, and may include at least one battery pack. The RESS 14 has a charge level indicating the amount of energy it has stored at any given time. The charging receptacle 16 is generally located on the underbody of the electric vehicle 12.

The electric vehicle 12 also includes a first controller 18 configured to monitor the status of the electric vehicle 12, such as when it is parked and fully stationary, and is ready for recharging. The first controller 18 is also configured to monitor the charge level of the RESS 14, as well as to monitor whether a charging plug 32 of the charging apparatus 30, described in more detail hereinafter, is fully plugged into the charging receptacle 16 such that recharging may be initiated. The first controller 18 also may be configured to communicate with a second controller 86 of the charging apparatus 30, also described in more detail hereinafter, as well as other devices of the charging apparatus 30. The first controller 18 further may be configured to communicate with other systems and devices of the electric vehicle 12 to perform other functions unrelated to the recharging of the RESS 14.

Figure 2:
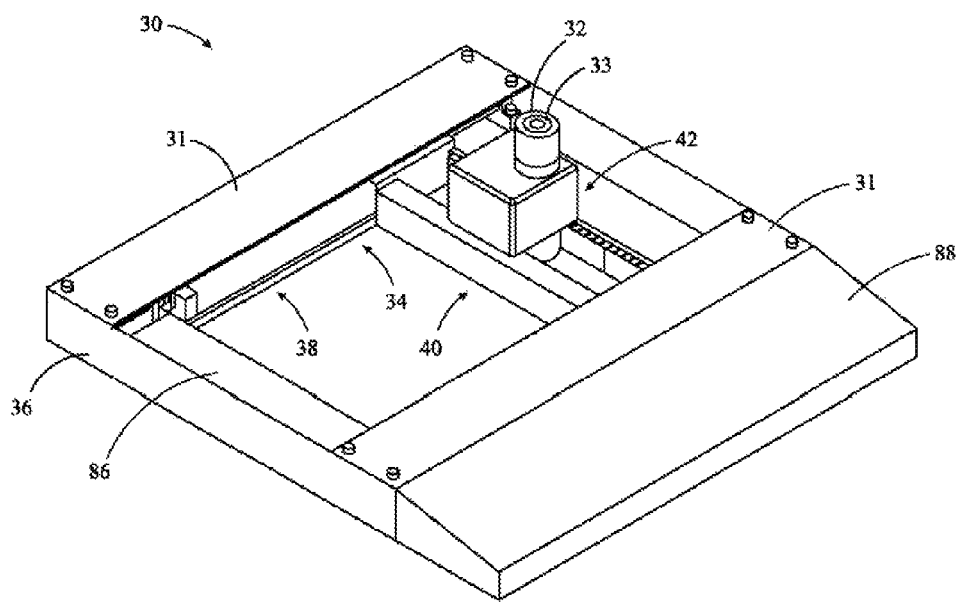
FIG. 2 is a schematic, perspective view of the charging apparatus of FIG. 1, where the charging apparatus has a charging plug and a movement mechanism.

Referring now to FIG. 2, the charging apparatus 30 generally includes a charging plug 32 and a movement mechanism 34 configured to move the charging plug 32. The charging plug 32 may have a channel 33 such that the charging plug 32 may mate with the charging receptacle 16 to recharge the RESS 14. The charging apparatus 30 may also include a base 36 to which the movement mechanism 34 may be attached. The charging apparatus 30 may further include covers 31 to prevent dirt or other contaminants from entering components of the charging apparatus 30.

The movement mechanism 34 may include a first movement device 38, a second movement device 40, and a third movement device 42, as depicted in FIGS. 3, 4, and 5A and B, respectively, and described in more detail hereinafter. The first movement device 38 and the second movement device 40 may be connected to each other, and are configured to move the charging plug 32 laterally and longitudinally, respectively, to align it with the charging receptacle 16. The third movement device 42 is configured to move the charging plug 32 vertically to be inserted into or removed from the charging receptacle 16. As depicted in FIG. 2, the first movement device 38 may be secured to the base 36 such that it is stationary, while the second movement device 40 may be slidable along the first movement device 38 in a lateral direction. The third movement device 42, in turn, may be attached to and slidable along the second movement device 40 in a longitudinal direction.

It should be appreciated that the second movement device 40 may be the stationary component, and the first movement device 38 may be the slidable component along the second movement device 40 in the longitudinal direction. The third movement device 42, in turn, may be attached to and slidable along the first movement device 38 in the lateral direction.

Referring now to FIG. 3, the first movement device 38 includes a first motor 44, which generates motor torque to provide movement. The first motor 44 may be, but is not limited to, a stepper motor. To translate the motor torque into linear movement, the first movement device 38 may also have a first coupling 46 and a ball screw system that includes a first ball screw 48 and a first ball screw nut 50. The first coupling 46 transfers the motor torque to the first ball screw 48. As the first ball screw 48 rotates, the first ball screw nut 50 moves linearly along the first ball screw 48. It should be appreciated that any mechanism capable of providing linear movement is considered.

The first movement device 38 also may include a first guide rail 52 and a first guide block 54. The first guide rail 52 generally spans the length of the first ball screw 48. The first guide block 54 is attached to and is slidable along the first guide rail 52. The first guide block 54 moves together with the first ball screw nut 50, and serves to prevent the first ball screw nut 50 from rotating along with the first ball screw 48. The second movement device 40 may be attached to the first ball screw nut 50 and the first guide block 54 such that the second movement device 40 may move laterally, as explained above.

The first movement device 38 may further include a first frame 56 to which the first motor 44 may be mounted, and to which the first ball screw 48 and the first guide rail 52 may be secured. The first frame 56, in turn, may be secured to the base 36 such that the first movement device 38 is stationary, as explained above.

Referring now to FIG. 4, the second movement device 40 includes a second motor 58, which generates motor torque to provide movement. As with the first motor 44, the second motor 58 may be, but is not limited to, a stepper motor. The second movement device 40 may also have a second coupling 60 and a ball screw system that includes a second ball screw 62 and a second ball screw nut 64. As with the first movement device 38, the second coupling 60 transfers the motor torque produced by the second motor 58 to the second ball screw 62. As the second ball screw 62 rotates, the second ball screw nut 64 moves linearly along the second ball screw 62, thereby translating the motor torque into linear movement in the longitudinal direction. It should be appreciated that any mechanism capable of providing linear movement is considered.

The second movement device 40 also may include a second guide rail 66 and second guide blocks 68. The second guide blocks 68 are attached to and are slidable along the second guide rail 66. The third movement device 42 may be attached to the second ball screw nut 64 and the second guide blocks 68, as depicted in FIGS. 5A and 5B, such that the third movement device 42 may move in the longitudinal direction, as explained above.

The second movement device 40 may further include a second frame 70 to which the second motor 58 may be mounted, and to which the second ball screw 62 and the second guide rail 66 may be secured. The second frame 70 may have flanges 72 where the second movement device 40 may be attached to the first ball screw nut 50 and the first guide block 54, as explained above, as well as to the base 36, which may similarly have a guide rail and guide block, to which one of the flanges 72 may be attached, located opposite of the first movement device 38 beneath the cover 31 depicted in FIG. 2. The second frame 70 may also have covers 71 and 73 to cover the second ball screw 62 and the second guide rail 66, respectively, to protect them from dirt and other contaminants.

Figure 5B:
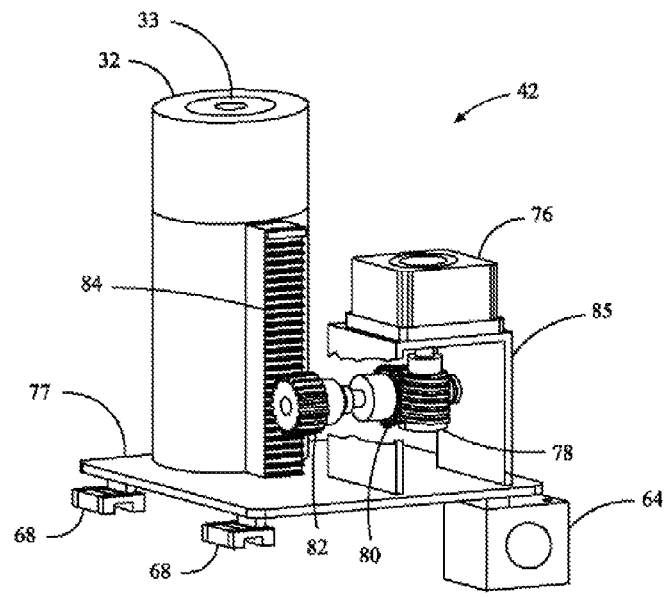
FIG. 5B is a schematic, perspective view illustrating the internal components of the third movement device of FIG. 5A.

Referring now to FIG. 5A, the third movement device 42 may include a housing 74 in which its components, as well as the charging plug 32 when not in use, are housed and/or secured, as depicted in FIG. 5B. The housing 74 may be attached to the second ball screw nut 64 and the second guide blocks 68 such that the third movement device 42 may move longitudinally, as explained above.

The housing 74 may include a housing cover 75 and a housing base 77. The housing cover 75 may have a plug opening 79 through which the charging plug 32 moves when in operation. The third movement device 42 may include a plug cap 81 to cover the plug opening 79 to prevent dirt or other contaminants from entering the housing 74 and/or the charging plug 32 when not in operation. The moving of the plug cap 81 on and off of the plug opening 79 may be performed by a plug cap motor 83, which may be, but is not limited to, a servo motor. In another embodiment not shown, the plug cap 81 may fit within the channel 33 of the charging plug 32 such that it fills the channel 33 when not in operation. When in operation, the plug cap 81 may retract or otherwise be removed to re-form the channel 33 such that the charging plug 32 may mate with the charging receptacle 16.

Referring now to FIG. 5B, in which the third movement device 42 is shown with the housing cover 75 removed, the third movement device 42 includes a third motor 76, which generates motor torque to provide movement. Again, as with the first motor 44 and the second motor 58, the third motor 76 may be, but is not limited to, a stepper motor. To translate the motor torque generated by the third motor 76 into linear movement to move the charging plug 32 in the vertical direction, the third movement device 42 may implement a rack-and-pinion mechanism that includes a worm 78, a worm wheel 80, a pinion 82, and a rack 84. The rack 84 is attached to the charging plug 32.

The worm 78 is connected to the third motor 76 via a common axis such that the worm 78 rotates with the third motor 76. As the worm 78 rotates, it engages with the worm wheel 80, thereby causing it to rotate about its own axis. The worm wheel 80 is connected to the pinion 82 via a common axis. As such, the pinion 82 rotates about the axis simultaneously with the worm wheel 80. As the pinion 82 rotates, it engages with the rack 84 to move it, and therefore, the charging plug 32, vertically either up or down, thereby effectively translating the motor torque into linear movement. The direction of the rack 84 and the charging plug 32, i.e., up or down, is dependent upon the direction of rotation of the pinion 82. It should be appreciated that any mechanism capable of providing linear movement is considered.

The third movement device 42 may also include a motor mount 85 to which the third motor 76, the worm wheel 80, and the pinion 82 may be mounted and secured.

Referring back to FIG. 2, the charging apparatus 30 also includes a second controller 86. The second controller 86 is configured to control the movement mechanism 34, specifically the first motor 44, the second motor 58, and the third motor 76. The second controller 86 is also configured to communicate with the first controller 18, as explained above. The second controller 86 is further configured to communicate with the power source 26 to control the charging of the RESS 14.

The charging apparatus 30 further may include a safety ramp 88 at the front of the charging apparatus 30. The front is generally the side facing the direction in which the electric vehicle 12 is moving toward the charging apparatus 30. The safety ramp 88 may be configured to absorb a substantial amount of the weight of the electric vehicle 12 such that the maximum stress on the other components of the charging apparatus 30 do not exceed their material yield strength when the electric vehicle 12 is positioned on the safety ramp 88. As such, it may act as a buffer in such situations, as well as a warning or detection to a driver of the electric vehicle 12 that it has encroached upon the charging apparatus 30. This allows for the protection of the remaining portions of the charging apparatus 30 from any potential damage that may occur should the electric vehicle 12 encroach further upon the other components, such as the movement mechanism 34 and the second controller 86.

The charging apparatus 30 further may include a remote center of compliance (RCC) device 87 to be used for fine alignment of the charging plug 32 with the charging receptacle 16, as depicted in FIGS. 6A through 6D. The RCC device 87 may allow for translation of the charging plug 32 without rotation if it comes into contact with a wall of the charging receptacle 16. The tip of the charging plug 32 must be substantially aligned with the center of compliance. In addition, the RCC device 87 should be positioned such that it is a distance P from the tip of the charging plug 32 to allow for the translation without rotation. The RCC device 87 may have both positional and torsional error correction.

Figures 6A, 6B, 6C, 6D:
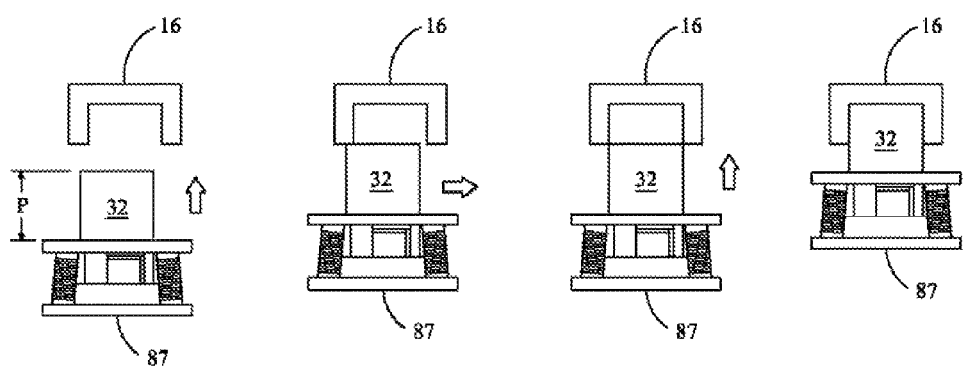
FIGS. 6A through 6D are schematic, front views illustrating the operation of a remote center of compliance (RCC) device employed in the automated recharging system of FIG. 1.

As the charging plug 32 is moved vertically toward the charging receptacle 16, as depicted in FIG. 6A, the charging plug 32 may be slightly misaligned such that it may contact the wall of the charging receptacle 16, as depicted in FIG. 6B. In such a scenario, the RCC device 87 will correct the alignment of the charging plug 32, as depicted in FIG. 6C, such that it may be properly inserted into the charging receptacle 16 without rotation, as depicted in FIG. 6D.

Figure 7:
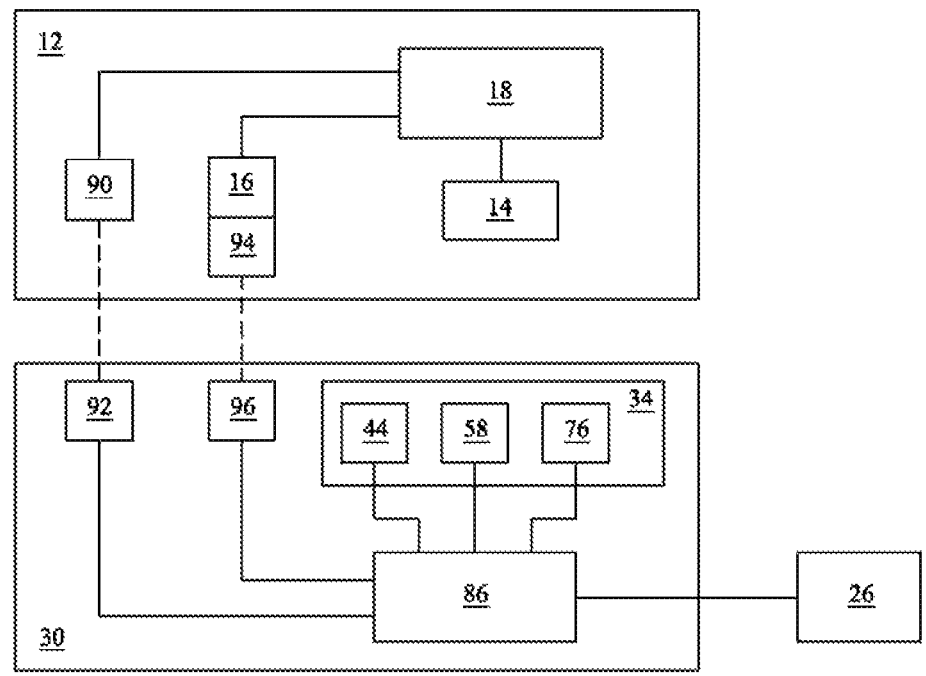
FIG. 7 is a schematic, block diagram of the communication between the electric vehicle and the charging apparatus.

Referring now to FIG. 7, a block diagram of the automated recharging system 10 illustrating the communication between the electric vehicle 12 and the charging apparatus 30 is shown. The dashed lines indicate a wireless signal. The electric vehicle 12 may have a first wireless communication module 90, and the charging apparatus 30 may have a second wireless communication module 92 to enable the communication, specifically between the first controller 18 and the second controller 86. As such, the first controller 18 may be able to send to the second controller 86 such information as the electric vehicle 12 being parked, plugging of the charging plug 32 into the charging receptacle 16 being complete, and charging of the RESS 14 being complete. The first wireless communication module 90 and the second wireless communication module 92 may be, but are not limited to, Bluetooth modules.

Figure 8:
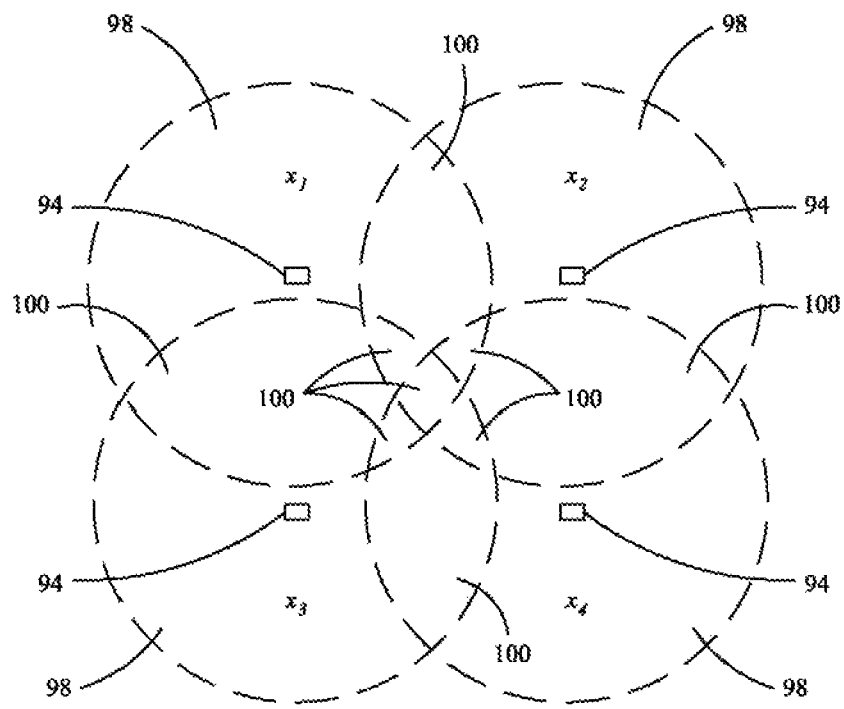
FIG. 8 is a schematic diagram of an array of radio-frequency identification (RFID) tags employed in the automated recharging system of FIG. 1.

To automatically locate the charging plug 32 in relation to the charging receptacle 16, the electric vehicle 12 may have a plurality of radio-frequency identification (RFID) tags 94, and the charging apparatus 30 may have a RFID reader 96. The RFID tags 94 may be arranged in an array around the charging receptacle 16, as depicted in FIG. 8. While FIG. 8 shows a total of four RFID tags 94 arranged in a 4×3 rectangular array, it should be appreciated that the array may include as many RFID tags 94 as necessary, and in any array configuration. The RFID reader 96 generally may be located on the third movement device 42 near the charging plug 32.

Referring now to FIG. 8, each RFID tag 94 has a primary reception zone 98, the boundaries of which are indicated by dashed lines. Each primary reception zone has an associated tag identification (ID) value $x_{1\ldots n}$, where n is the total number of RFID tags 94 being implemented. For example, the $x_1$, $x_2$, $x_3$, and $x_4$ in the embodiment depicted in FIG. 8 may be 32, 33, 102, and 103, respectively. While the primary reception zones 98 are shown to be circular in shape, it should be appreciated that they may be any shape depending upon the type of RFID tag 94 and RFID reader 96 used in the automated recharging system 10.

The primary reception zones 98 may overlap to form secondary reception zones 100 so that there are no dead pockets where the RFID reader 96 is unable to identify any reception zone. As depicted in FIG. 8, there may be up to four primary reception zones 98 overlapping in a given location of the array of RFID tags 94 to form as many as nine secondary reception zones 100. However, it should be appreciated that some primary reception zones 98 may overlap with as few as one other primary reception zone 98, or none at all. The RFID reader 96 may be configured to read a maximum of four RFID tags 94 simultaneously.

Each secondary reception zone 100 has an associated tag sum value that is equal to the sum of the tag ID values of the overlapping primary reception zones 98 that form the given secondary reception zone 100. The calculation of the tag sum values may be performed by the second controller 86, as described in method 200 below. Continuing with the example above, the secondary reception zone 100 formed by the overlapping of primary reception zones 98 having tag ID values of 32 and 33 has a tag sum value of 65. The secondary reception zone 100 formed by the overlapping of all of the primary reception zones 98 has a tag sum value of 270. The tag ID values $x_{1\ldots n}$ are assigned such that each is unique, and that they will not result in duplicate tag sum values. As such, one of the tag ID values or tag sum values may be assigned to the location of the charging receptacle 16. For example, the charging receptacle 16 may be located in the secondary reception zone 100 has an associated tag sum value of 270. The surrounding tag ID values and tag sum values may then be utilized to locate the charging plug 32 in relation to the charging receptacle 16, as described in method 200 below. The tag ID values and the tag sum values, as well as the pairing of the charging receptacle 16 location and the associated tag ID value or tag sum value, may be stored in the second controller 86.

In some embodiments, the primary reception zone 98 or the secondary reception zone 100 associated with the location of the charging receptacle 16 may be larger than the actual positioning accuracy required for plugging the charging plug 32 into the charging receptacle 16. As such, the location of the charging receptacle 16 may have to be more precisely defined than just assigning the associated tag ID value or tag sum value to it, as explained above. To accomplish this, the second controller 86 may determine minimum and maximum y (or longitudinal) and x (or lateral) positions to determine the boundary of the primary reception zone 98 or secondary reception zone 100 associated with the location of the charging receptacle 16, based on the tag ID value(s) and/or tag sum value(s) it receives from the RFID reader 96. The second controller 86 may then calculate average x and y positions to more accurately locate the charging receptacle 16 within the larger primary reception zone 98 or secondary reception zone 100. Referring back to FIG. 7, the tag ID value or tag sum value associated with its respective primary reception zone 98 or secondary reception zone 100 of the RFID tag(s) 94 within the range of the RFID reader 96 is transmitted to the RFID reader 96. Again, the RFID reader 96 may read one to four RFID tags 94 simultaneously. The RFID reader 96, in turn, relays the received tag ID value or tag sum value to the second controller 86. The second controller 86 may then be able to determine the location of the charging plug 32, and may operate the first motor 44 and/or the second motor 58 to move the charging plug 32 until the tag value or tag sum value received by the RFID reader 96 is the one assigned to the charging receptacle 16.

To further the locating of the charging plug 32 in relation to the charging receptacle 16, and determining how far the charging plug 32 needs to be moved such that it may be substantially aligned with the charging plug 32, the tag ID values and tag sum values may be designated as "near" or "far" from the charging receptacle 16. For "far" designations, there may be a defined distance in the lateral and longitudinal directions to move the charging receptacle 16 into a primary reception zone 98 or secondary reception zone 100 having a "near" tag ID value or tag sum value, such that the process may be expedited. For "near" designations, the process may be as described above.

The first controller 18 may be connected to the charging receptacle 16 so that it may monitor when the charging plug 32 is fully plugged into the charging receptacle 16 such that charging may be initiated, as explained above. The first controller 18 may also be connected to the RESS 14 so that it may monitor the charge level to determine when charging is complete and thus may be terminated. The first controller 18 may then transmit these statuses to the second controller 18 via the first and second wireless communication modules 90 and 92 so that the second controller 86 may act accordingly.

The second controller 86 may be connected to the movement mechanism 34, specifically the first motor 44, the second motor 58, and the third motor 76, to control the movement of the charging plug 32. The second controller 86 may also be connected to the RFID reader 96, and to the power source 26 to control the charging feed.

Figure 9:
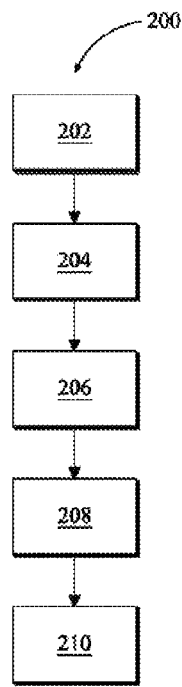
FIG. 9 is a schematic, flow diagram illustrating an exemplary method of automatically recharging an electric vehicle.

Referring now to FIG. 9, a method 200 for automatically recharging the electric vehicle 12 utilizing the automated recharging system 10 is shown. Prior to beginning method 200, the electric vehicle 12 is parked and stationary. The charging apparatus 30 generally is positioned beneath the electric vehicle 12, as depicted in FIG. 1 and explained above.

Method 200 begins at step 202 in which the first controller 18 of the electric vehicle 12 sends a signal to the second controller 86 of the charging apparatus 30 indicating that the electric vehicle 12 is stationary and parked, and ready for recharging. As depicted in FIG. 7 and explained above, the signal may be sent from the first controller 18 to the second controller 86 via the first wireless communication module 90 and the second wireless communication module 92. Alternatively, a specified time at which charging is to be initiated may be set in the first controller 18. In such an embodiment, the first controller 18 may send a signal to the second controller 86 to initiate charging at that specified time.

Figure 10:
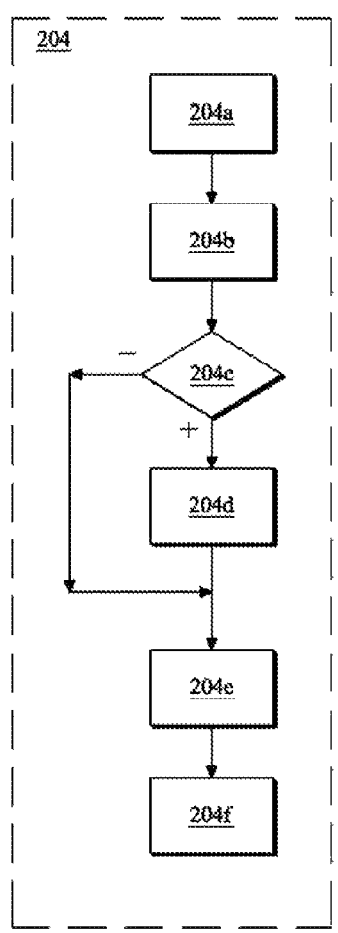
FIG. 10 is a schematic, flow diagram illustrating one step of the method of FIG. 9.

After step 202, method 200 proceeds to step 204. At step 204, the charging plug 32 is aligned with the charging receptacle 16. This may include several sub-steps, as depicted in FIG. 10. As explained above, the electric vehicle 12 may have a plurality of RFID tags 94, and the charging apparatus 30 may have an RFID reader 96 to automatically locate the charging plug 32 in relation to the charging receptacle 16.

Referring now to FIG. 10, at sub-step 204a, the tag ID value(s) associated with the primary reception zone(s) 98 of the RFID tag(s) 94 within the range of the RFID reader 96 is transmitted to the RFID reader 96. At sub-step 204(b), the RFID reader 96, in turn, relays the tag ID value(s) to the second controller 86. If there is more than one tag ID value received, which is determined at step 204c, method 200 proceeds to step 204d in which the second controller 86 adds the tag ID values to obtain the tag sum value. Otherwise, method 200 proceeds to step 204e in which the second controller 86 processes the tag value or tag sum value to determine the location of the charging plug 32 in relation to the charging receptacle 16. At step 204f, the second controller 86 controls the movement mechanism 34, specifically the first motor 44 and the second motor 58, to move the charging plug 32. These sub-steps are repeated until the tag ID value or tag sum value processed by the second controller 86 matches the tag ID value or tag sum value assigned to the location of the charging receptacle 16.

Referring back to FIG. 9, method 200 proceeds to step 206 after step 204. At step 206, the charging plug 32 is inserted into the charging receptacle 16. The second controller 86 controls the third motor 76 such that the charging plug 32 is moved vertically until it latches in the charging receptacle 16. As explained above, the charging apparatus 30 may include a RCC device 87 that may ensure that the charging plug 32 is precisely inserted into the charging receptacle 16 without experiencing any rotation due to lateral forces resulting from interference with the charging receptacle 16 wall.

After step 206, method 200 proceeds to step 208. At step 208, the second controller 86 communicates with the power source 26 to recharge the RESS 14 until its charge level has reached full capacity or a desired level. This may include several sub-steps, as depicted in FIG. 11.

Figure 11:
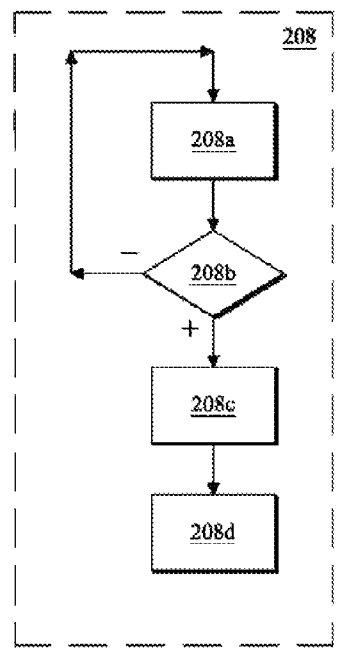
FIG. 11 is a schematic, flow diagram illustrating another step of the method of FIG. 9.

Referring now to FIG. 11, at sub-step 208a, the second controller 86 communicates with the power source 26 to provide a power feed such that recharging may be initiated. At sub-step 208b, the first controller 18 determines if the charge level of the RESS 14 has reached full capacity or the desired level. As explained above, the first controller 18 may be configured to monitor the charge level. If the charge level has reached full capacity or the desired level, method 200 proceeds to sub-step 208c, in which the first controller 18 sends a signal to the second controller 86 that charging is complete. Otherwise, the second controller 86 will maintain communication with the power source 26 to continue the power feed. At sub-step 208d, the second controller 86 communicates with the power source 26 to terminate the power feed.

Referring back to FIG. 9, method 200 ends at step 210 in which the second controller 86 controls the third motor 76 such that the charging plug 32 is unplugged from the charging receptacle 16 and retracted back into the housing 74 of the third movement device 42. It should be appreciated that the charging plug 32 may remain plugged into the charging receptacle 16 after charging of the RESS 14 is complete such that the charging apparatus 30 may be reused if the electric vehicle 12 is not intended to be immediately driven after charging.

In embodiments in which the charging apparatus 30 includes a plug cap 81 with the third movement device 42, method 200 may further include covering the charging plug 32 with the plug cap 81 to protect it from dirt or other contaminants.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An automated recharging system comprising:
   an electric vehicle having:
      a rechargeable energy storage system (RESS) having a charge level;
      a charging receptacle in electrical communication with the RESS;
      a plurality of radio-frequency identification (RFID) tags arranged in an array around the charging receptacle, each of the RFID tags having a primary reception zone with an associated tag identification (ID) value;
      a first controller configured to monitor the electric vehicle, the charge level of the RESS, and the charging receptacle;
   a charging apparatus having:
      a charging plug configured to mate with the charging receptacle of the electric vehicle to recharge the RESS;
      a movement mechanism configured to substantially align the charging plug with the charging receptacle, and to insert the charging plug into the charging receptacle, wherein the movement mechanism is configured to move the charging plug relative to the charging receptacle between a plugged position and an unplugged position;
      a RFID reader configured to read at least one of the plurality of RFID tags;
      a second controller configured to communicate with the first controller, to communicate with the RFID reader, to control the movement mechanism, and to initiate and terminate recharging of the RESS; and
   wherein, in the plugged position, the charging plug is in contact with the charging receptacle; and
   wherein at least two of the primary reception zones of the RFID tags overlap to create at least one secondary reception zone having an associated tag sum value equal to the sum of the tag ID values associated with the at least two overlapping primary reception zones, and one of the tag ID values or the tag sum value is assigned to a location of a charging receptacle zone.

2. The automated recharging system of claim 1 wherein the movement mechanism comprises a first movement device, a second movement device, and a third movement device configured to move the charging plug laterally, longitudinally, and vertically, respectively, the charging plug being connected to the third movement device.

3. The automated recharging system of claim 2 wherein the first movement device, the second movement device, and the third movement device comprise a first motor, a second motor, and a third motor, respectively, that each generate motor torque.

4. The automated recharging system of claim 3 wherein the first movement device and the second movement device each further comprise a ball screw mechanism to translate the motor torque generated by the first motor and the second motor, respectively, into linear movement.

5. The automated recharging system of claim 3 wherein the third movement device further comprises a rack-and-pinion mechanism to translate the motor torque generated by the third motor into linear movement in a vertical direction.

6. The automated recharging system of claim 3 wherein the first motor, the second motor, and the third motor are stepper motors.

7. The automated recharging system of claim 1 further comprising a plug cap configured to cover the charging plug when the charging apparatus is not in operation.

8. The automated recharging system of claim 7 further comprising a servo motor configured to move the plug cap on and off of the charging plug.

9. The automated recharging system of claim 1 wherein the electric vehicle and the charging apparatus further comprise a first wireless communication module and a second wireless communication module, respectively, to enable communication between the first controller and the second controller.

10. The automated recharging system of claim 1 wherein at least two of the primary reception zones of the RFID tags overlap to create at least one secondary reception zone having an associated tag sum value equal to the sum of the tag ID values associated with the at least two overlapping primary reception zones.

11. The automated recharging system of claim 10 wherein the at least one secondary reception zone is formed by a maximum of four overlapping primary reception zones.

12. The automated recharging system of claim 10 wherein one of the tag ID values or the at least one tag sum value is assigned to a location for the charging receptacle.

13. The automated recharging system of claim 1 further comprising a remote center of compliance (RCC) device to further align the charging plug with the charging receptacle.

14. The automated recharging system of claim 1 wherein the charging apparatus further comprises a safety ramp configured to substantially absorb the weight of the electric vehicle.

15. A method for automatically recharging an electric vehicle via a charging apparatus, the electric vehicle having a rechargeable energy storage system (RESS), a charging receptacle, a plurality of radio-frequency identification (RFID) tags, and a first controller, and the charging apparatus having a charging plug, a movement mechanism, a RFID reader, and a second controller, the method comprising:
  receiving, by the second controller, a first signal from the first controller indicating that the electric vehicle is parked and ready for recharging;
  substantially aligning the charging plug with the charging receptacle, wherein the substantial aligning of the charging plug with the charging receptacle comprises:
    receiving, by the RFID reader, at least one tag ID value from an associated RFID tag;
    transmitting the at least one tag ID value to the second controller;
    calculating, by the second controller, a tag sum value;
    processing the tag sum value to determine an initial location of the charging plug in relation to the charging receptacle; and
    moving, by the movement mechanism, the charging plug such that the charging plug is substantially aligned with the charging receptacle;
  inserting, by the movement mechanism, the charging plug into the charging receptacle;
  charging the RESS of the electric vehicle; and
  wherein the plurality of RFID tags are arranged in an array around the charging receptacle, and each RFID tag has a primary reception zone with an associated tag ID value.

16. The method of claim 15 further comprising receiving, by the second controller, a second signal from the first controller indicating that the RESS is charged to a desired charge level.

17. The method of claim 16 further comprising terminating the charging of the RESS, and removing the charging plug from the charging receptacle.

18. The method of claim 15 wherein at least two of the primary reception zones of the RFID tags overlap to create at least one secondary reception zone having an associated tag sum value equal to the sum of the tag ID values associated with the at least two overlapping primary reception zones, and wherein one of the plurality of tag ID values or the tag sum value is assigned to a location of a charging receptacle zone.

19. The method of claim 15, wherein the charging plug is in contact with the charging receptacle when the charging plug is inserted into the charging receptacle.

20. A method for automatically recharging an electric vehicle via a charging apparatus, the electric vehicle having a rechargeable energy storage system (RESS), a charging receptacle, a plurality of radio-frequency identification (RFID) tags, and a first controller, and the charging apparatus having a charging plug, a movement mechanism, a RFID reader, and a second controller, the method comprising:
  receiving, by the second controller, a first signal from the first controller indicating that the electric vehicle is parked and ready for recharging;
  substantially aligning the charging plug with the charging receptacle;
  inserting, by the movement mechanism, the charging plug into the charging receptacle;
  charging the RESS of the electric vehicle;
  wherein the plurality of RFID tags are arranged in an array around the charging receptacle, and each RFID tag has a primary reception zone with an associated tag ID value; and
  wherein at least two of the primary reception zones of the RFID tags overlap to create at least one secondary reception zone having an associated tag sum value equal to the sum of the tag ID values associated with the at least two overlapping primary reception zones, and wherein one of the tag ID values or the tag sum value is assigned to a location of a charging receptacle zone.

* * * * *